United States Patent [19]

Mueller

[11] 4,156,194

[45] May 22, 1979

[54] FREQUENCY-SHIFT-KEYED RECEIVER

[75] Inventor: Otward Mueller, Lynchburg, Va.

[73] Assignee: General Electric Company, Lynchburg, Va.

[21] Appl. No.: 830,435

[22] Filed: Sep. 6, 1977

[51] Int. Cl.² .................. H04B 1/16; H04L 27/14; H04M 11/00; G08C 19/14

[52] U.S. Cl. .................... 325/320; 329/122; 340/310 A; 340/171 A; 340/207 R; 361/67; 178/66 A

[58] Field of Search ................ 325/30, 320, 345, 346, 325/349; 178/66 A, 88; 329/104, 110, 112, 122, 124; 361/68, 64, 67; 340/151, 171 R, 171 A, 207 R, 310 A, 506, 507

[56] References Cited

U.S. PATENT DOCUMENTS

| 3,568,067 | 3/1971 | Williford | 325/320 |
|---|---|---|---|
| 3,854,099 | 12/1974 | Kratt et al. | 329/110 |
| 3,971,988 | 7/1976 | Denenberg | 325/316 |
| 4,013,965 | 3/1977 | Scharte | 325/320 |
| 4,015,206 | 3/1977 | Huntley | 325/320 |

OTHER PUBLICATIONS

Park, "An FM Detector for Low S/N," *IEEE Trans. on Communication Technology*, vol. Com-18, No. 2, Apr. 1970, pp. 110–118.

Denenberg, "Spectral Moment Estimators," *Bell System Technical Journal*, vol. 55, Feb. 1976, No. 2, pp. 143–155.

*Primary Examiner*—John C. Martin
*Attorney, Agent, or Firm*—James J. Williams

[57] ABSTRACT

Frequency-shift-keyed signals are detected by a receiver having an input which supplies the received signals to first and second mixers. A local oscillator produces signals at a frequency midway between the two frequencies of the frequency-shift-keyed signals. The oscillator signals are supplied to the first mixer at a first phase angle (sine), and are supplied to the second mixer at a second phase angle (cosine) displaced 90 degrees with respect to the first phase angle. The first mixer output is applied to a first lowpass filter which removes the high frequency (or sum) signals and passes only the low frequency (or difference) signals. The second mixer output is applied to a second lowpass filter which also removes the high frequency (or sum) signals and passes the low frequency (or difference) signals. The first filter signals are applied to a first 90 degree phase shifter, and the second filter signals are applied to a second 90 degrees phase shifter. First sum and difference circuits are connected to the two filters and the two phase shifters to produce two signals, each of which varies between two levels depending upon which frequency is received. Second sum and difference circuits are connected to the two filters and the two phase shifters to produce two signals, each of which also varies between two levels depending upon which frequency signal is received. Each of the signals produced by the two sum and difference circuits can be rectified and summed to produce an output signal which also varies between two levels depending upon which frequency signal is received. This output signal provides reliable indication of the frequency of the received signals, and can be used in various ways, such as in guard-trip control of power systems.

13 Claims, 3 Drawing Figures

| FSK SIGNAL INPUT | THRESHOLD 26 OUTPUT | THRESHOLD 27 OUTPUT | DETECTOR 30 OUTPUT | INVERTER 29 OUTPUT | GATE 31 OUTPUT |
|---|---|---|---|---|---|
| NO SIGNAL | 0 | 0 | 0 | 1 | 0 |
| GUARD ONLY | 0 | 1 | 0 | 0 | 0 |
| TRIP ONLY | 1 | 0 | 0 | 1 | 1 |
| GUARD & TRIP | 1 | 1 | 1 | 0 | 0 |

FIG. 2

FREQUENCY-SHIFT-KEYED RECEIVER

BACKGROUND OF THE INVENTION

My invention relates to a frequency-shift-keyed receiver, and particularly to such a receiver for use in power line carrier systems and other noisy environments.

Frequency-shift-keyed signals are used extensively in various communication systems. One such use is in 60 Hertz power line systems where line conditions are indicated by frequency-shift-keyed signals. For example, a first power station may supply power over a transmission line to a second station. The second station monitors its loads and other outgoing lines, and as long as these loads and lines are in good condition, the second station sends a first frequency guard signal to the first station. As long as the first station receives this guard signal, it supplies power over the line to the second station. But if the second station detects an improper condition, such as a fault on one of its outgoing lines, the second station removes the guard signal and sends a second frequency trip signal to the first station. Upon loss of the guard signal and upon receipt of the trip signal, the first station trips (or opens) the transmission line to the second station, thereby protecting the equipment at the first station. Because of modern society's need for electrical power, the decision to maintain or open an electrical power line is very important.

Accordingly, a primary object of my invention is to provide a new and improved frequency-shift-keyed receiver for use in the control of electrical power lines.

Another object of my invention is to provide a new and improved frequency-shift-keyed receiver.

Usually, the guard and trip signals are sent and received by carrier frequencies over telephone lines or radio circuits. But whatever facility or circuit may be used, its connection or utilization at a 60 Hertz power station makes it inherently noisy from an electrical view-point. And when there is a 60 Hertz power or equipment malfunction, the communication facility or circuit may become even noisier, just at the time reliable guard and trip signals are most needed. While telephone lines or circuits are reliable, they may be subjected to alien tones by accident or by cross-talk. If such an alien tone were at or close to the trip frequency, a false trip might occur.

Accordingly, another object of my invention is to provide a new frequency-shift-keyed receiver that provides improved reliable operation even under very noisy electrical conditions.

Another object of my invention is to provide a new frequency-shift-keyed receiver that can detect the presence of two tones (guard and trip) at the same time, and prevent the trip tone from causing a trip function if the guard tone is present.

Frequency-shift-keyed receivers for power line trip and guard signals have been provided in the past. However, the ability of the prior art receivers has been limited because the desirable characteristics of the receiver made them relatively complicated and expensive.

Accordingly, another object of my invention is to provide a new and improved frequency-shift-keyed receiver that is relatively simple but that performs well and reliably.

Another object of my invention is to provide a new and improved frequency-shift-keyed receiver that can reliably indicate receipt of a first or guard frequency signal, a second or trip frequency signal, or both guard and trip frequency signals at the same time.

In one prior art frequency-shift-keyed receiver, crystal filters were used to detect receipt of the first frequency signal or the second frequency signal. Such crystal filters are relatively expensive, and if the guard and trip frequencies must be changed, then additional crystal filters are required for that receiver.

Accordingly, another object of my invention is to provide a new and improved frequency-shift-keyed receiver that does not require crystal filters, and that can have its frequency of operation changed relatively easily.

SUMMARY OF THE INVENTION

Briefly, these and other objects are achieved in accordance with my invention by mixing the received frequency-shift-keyed signals with two quadrature or 90 degree related signals having a frequency centered between the upper and lower frequency-shift-keyed signals. The two mixed signals are filtered with respective lowpass filters to remove the higher frequency components and provide the desired channel selectivity, leaving only the low frequency components of the received signals in quadrature relation. These low frequency signals are respectively applied to phase shift circuits. The outputs of the filters and the outputs of the phase shift circuits are combined in summing and difference circuits to produce a plurality of signals, each of which has an amplitude indicative of whether the received signal is the upper frequency or the lower frequency. The plurality of signals may be utilized in any way desired, and may be combined to provide reliable indications of the received frequency signals, despite noise, alien tones, or other interference received along with the frequency-shift-keyed signals.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIG. 2 shows a table for explaining the operation of my receiver.

DESCRIPTION OF THE PREFERRED EMBODIMENT

Circuit Description

Figure 1A:
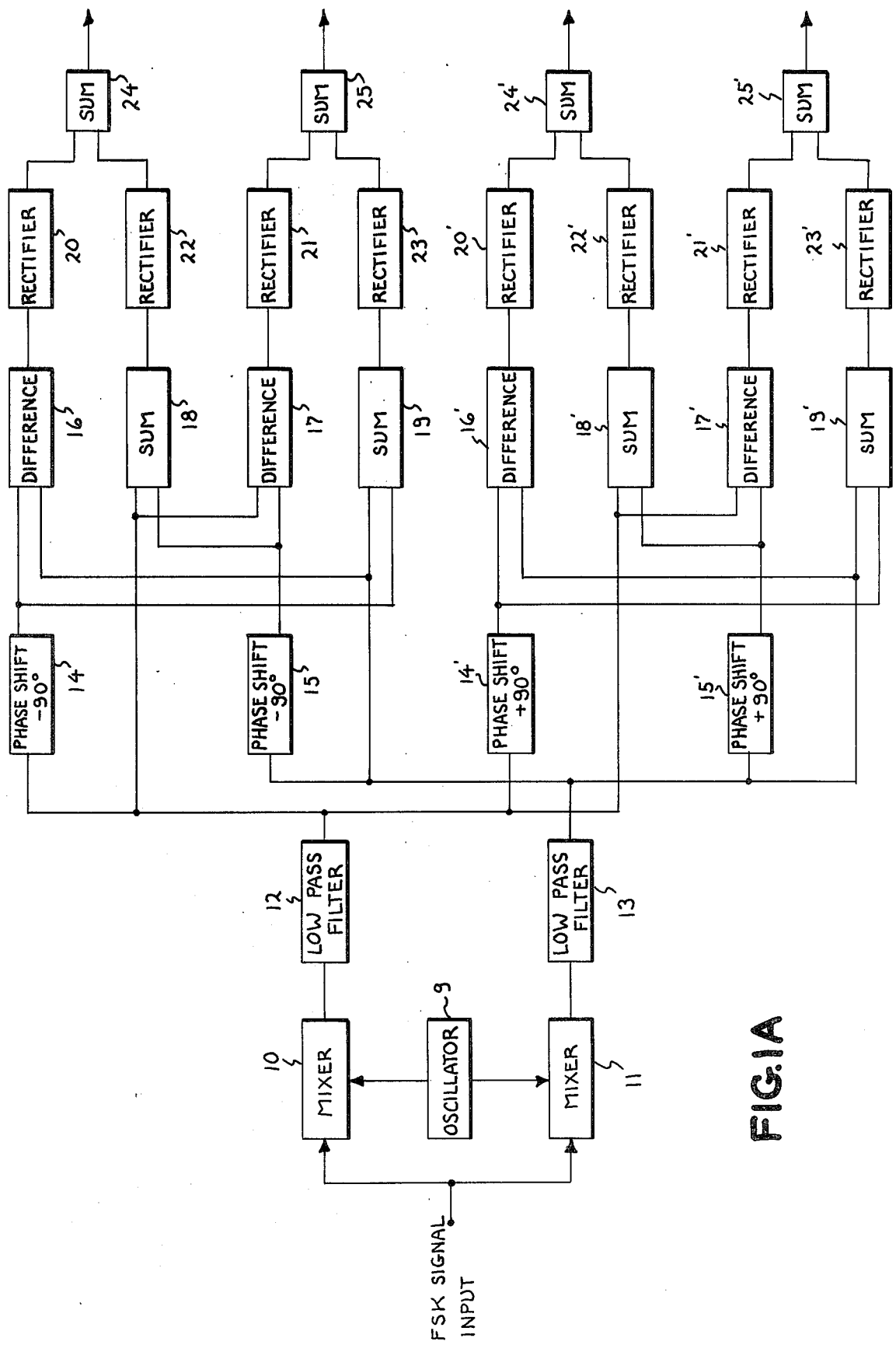
FIGS. 1A and 1B show a circuit diagram of a preferred embodiment of a frequency-shift-keyed receiver in accordance with my invention.
Figure 1B:
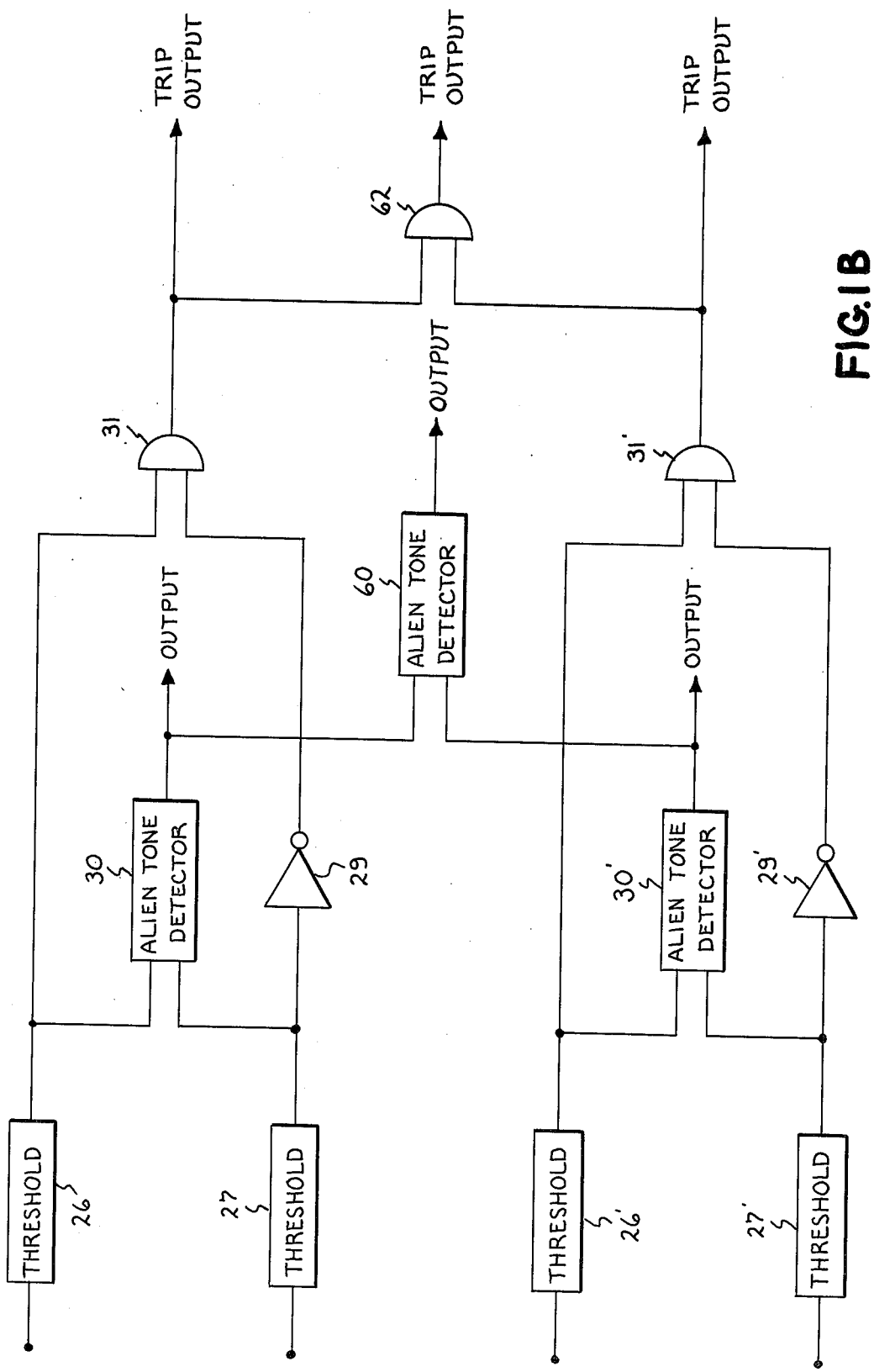

In this description, FIGS. 1A and 1B are to be considered together, with the leads at the right hand edge of FIG. 1A being considered to be connected to the correspondingly positioned leads at the left hand edge of FIG. 1B.

While my frequency shift keyed receiver is intended to operate in a typical voice frequency channel between 300 and 4000 Hertz, it should be understood that my receiver can operate at other frequencies, and can be used for other purposes. In this description, I have assumed by way of example that my receiver is intended to receive guard or trip signals for controlling the operation of a power line. I have also assumed a guard frequency $F_G$ of 2635 Hertz and a trip frequency $F_T$ of 2465 Hertz. In a given voice channel, other frequency-shift-keyed signals may also be supplied, provided sufficient spacing is provided between the various frequencies. If the voice channel was transmitted by a carrier, it will then be demodulated at the receiving end to the voice frequencies. These demodulated signals are the frequency-shift-keyed (FSK) signals applied to the input shown at the left of FIG. 1A. The FSK signals are split by any suitable means, such as a transformer or dual output amplifier, and applied to mixer circuits 10, 11. Each of the mixers 10,11 is supplied with a mixing signal of frequency $F_M$ from an oscillator 9. The oscillator 9 may be any suitable type of oscillator, but I prefer a frequency synthesizer having a stable, crystal controlled reference oscillator so that the mixing frequency $F_M$ may be changed to accommodate different frequencies of FSK signals. The mixing frequency $F_M$ is, in the assumed example, 2550 Hertz, which is midway between the assumed trip frequency $F_T$ (2465 Hertz) and the guard frequency $F_G$ (2635 Hertz). The mixing frequency $F_M$ applied to the mixer 10 is at one phase angle (cosine), and the mixing frequency $F_M$ applied to the mixer 11 is shifted 90 degrees (sine) with respect to the one phase angle for reasons that will be explained in the operation. The mixers 10, 11 produce sum and difference frequencies, and these are applied to low pass filters 12, 13 respectively which provide the desired channel selectivity. In the assumed example, the filters 12, 13 could cut off or attenuate frequencies above about 90 Hertz. For such filters, the sum frequencies from the mixers 10, 11 would be eliminated, and only the difference frequencies (namely 2635−2550 or 85 Hertz, and 2550−2465 or 85 Hertz) or lower frequencies would be passed.

The outputs of the filters 12, 13 are applied to two circuits, one of which appears in the upper half of FIGS. 1A and 1B and which is given plain reference numerals. The other circuit is in the lower half of FIGS. 1A and 1B. This other circuit is substantially identical to the one circuit, so that corresponding parts are given the same reference numerals with a prime suffix. Only the upper circuit with the plain reference numerals will be described, but it is to be understood that the lower circuit is substantially the same.

Signals from the low pass filter 12 are applied to a phase shift circuit 14 which introduces a phase shift of −90 degrees. Signals from the low pass filter 13 are applied to a phase shift circuit 15 which also introduces a phase shift of −90 degrees. These phase shift circuits 14, 15 may take any suitable form known in the art, as long as they introduce a 90 degree phase shift to the 85 Hertz difference frequency, and other phase shifts to other frequencies (which would be considered noise) below or above 85 Hertz. An example of a phase shift circuit would be a differentiator, an integrator, or an allpass phase shifter which introduces −90 degrees phase shift to the difference frequency of 85 Hertz, and which introduces a phase shift which changes with decreasing frequencies. A difference circuit 16 is provided and has one input connected to the output of the phase shift circuit 14, and the other input connected to the output of the low pass filter 13. A sum circuit 18 is provided and has one input connected to the output of the low pass filter 12, and the other input connected to the output of the phase shift circuit 15. A difference circuit 17 is provided and has one input connected to the output of the low pass filter 12, and the other input connected to the output of the phase shift circuit 15. And a sum circuit 19 is provided and has one input connected to the output of the low pass filter 13, and the other input connected to the output of the phase shift circuit 14. Each of the difference circuits may be an operational amplifier having its two inputs connected as shown to provide an output which represents the difference in the two inputs. Each of the sum circuits 18, 19 may also be an operational amplifier having one input connected to two outputs through respective isolating resistors, and having the other input connected to a reference voltage. In FIG. 1A, it will be noted that the inputs to the difference circuit 16 and the sum circuit 19 are derived from the same outputs of my circuit, and that the inputs of the sum circuit 18 and the difference circuit 17 are also derived from the same outputs of my circuit. Thus, the circuits 16, 19 are connected to the phase shift circuit 14 and the low pass filter 13, but the circuits 18, 17 are connected to the low pass filter 12 and the phase shift circuit 15. This varies or randomizes the effects of noise signals whose frequencies are less than the 85 Hertz cutoff of the low pass filters 12, 13 but treats the 85 Hertz tone signals substantially the same. As will be pointed out, this improves the reliability of my receiver.

The outputs of the difference circuit 16 and the sum circuit 18 are applied to respective full wave rectifiers 20, 22. The outputs of these rectifiers 20, 22 are applied to a sum circuit 24 which adds the voltages applied to it by the rectifiers 20, 22. Similarly, the outputs of the difference circuit 17 and the sum circuit 19 are applied to respective full wave rectifiers 21, 23, and the outputs of these rectifiers 21, 23 are applied to a sum circuit 25.

The outputs of the sum circuits 24, 25 may be filtered to reduce or smooth the ripple voltages. The filtered or unfiltered outputs of the sum circuits 24, 25 are applied to respective threshold circuits 26, 27. The outputs of the threshold circuits 26, 27 are applied to an alien tone detector 30. The output of the threshold circuit 27 is inverted by an inverter 29 whose output, along with the output of the threshold circuit 26, is applied to a two input AND gate 31. The output of the alien tone detector 30 may also be applied to one input of an alien tone detector 60. Likewise, the output of the AND gate 31 may also be applied to one input of an AND gate 62.

With respect to the lower part of FIGS. 1A and 1B, it will be noted that the circuit elements are substantially identical and have the same reference numerals followed by a prime suffix. The only difference between the lower circuit and the upper circuit is that the phase shift circuits 14', 15' introduce a +90 degree phase shift in place of the −90 degree phase shift introduced by the circuits 14, 15 so as to further randomize the signals. Otherwise, the circuits and connections are identical.

Circuit Operation

The operation of my receiver can, it is believed, be readily understood by utilization of mathematical expressions. In the following mathematical expressions, I have utilized abbreviations T, M, G, and Δ. These abbreviations have the following definitions:

$T = 2\pi F_T t$ $M = 2\pi F_M t$ $G = 2\pi F_G t$ $$M - G = -\Delta$$

$$M - T = \Delta$$

For the assumed example, the trip frequency $F_T$ would be 2465 Hertz, the mixing frequency $F_M$ would be 2550 Hertz, the guard frequency $F_G$ would be 2635 Hertz, t would be the time variable, and $\Delta$ would be the expression for the frequency difference of 85 Hertz. In this explanation, I have assumed that the guard and trip signals vary as a sine function, and that the oscillator 9 supplies a cosine signal to the mixer 10 and a sine signal to the mixer 11. I have also assumed that the signals T and G have an amplitude $2a$, and the signal M has an amplitude 1. With an applied guard signal, the mixer 10 produces:

$$\cos M \cdot 2a \sin G = \tfrac{1}{2}[2a \sin(M+G) + 2a \sin(M-G)] \quad \text{(Eq. 1)}$$

With an applied trip signal, the mixer 10 produces:

$$\cos M \cdot 2a \sin T = \tfrac{1}{2}[2a \sin(M+T) + 2a \sin(M-T)] \quad \text{(Eq. 2)}$$

For an applied guard signal, the mixer 11 produces:

$$\sin M \cdot 2a \sin G = \tfrac{1}{2}[2a \cos(M-G) - 2a \cos(M+G)] \quad \text{(Eq. 3)}$$

For an applied trip signal, the mixer 11 produces:

$$\sin M \cdot 2a \sin T = \tfrac{1}{2}[2a \cos(M-T) - 2a \cos(M+T)] \quad \text{(Eq. 4)}$$

The low pass filter 12 blocks the sum of the signals leaving only the difference signals, so that Equation 1 can be simplified to:

$$a \sin(M-G) = a \sin(-\Delta) = -a \sin \Delta \quad \text{(Eq. 5)}$$

And Equation 2 can be simplified to:

$$a \sin(M-T) = a \sin \Delta \quad \text{(Eq. 6)}$$

Similarly, the low pass filter 13 blocks the sum signals leaving only the difference signals, so that Equation 3 can be simplified to:

$$a \cos(M-G) = a \cos(-\Delta) = a \cos \Delta \quad \text{(Eq. 7)}$$

And Equation 4 can be simplified to:

$$a \cos(M-T) = a \cos \Delta \quad \text{(Eq. 8)}$$

Signals from the low pass filter 12 are applied to the phase shift circuit 14 which, for the guard signal of Equation 5, produces:

$$-a \sin(\Delta - 90°) = a \cos \Delta \quad \text{(Eq. 9)}$$

and for the trip signal of Equation 6 produces:

$$a \sin(\Delta - 90°) = -a \cos \Delta \quad \text{(Eq. 10)}$$

Similarly, the phase shift circuit 15 produces, for the guard signal of Equation 7:

$$a \cos(\Delta - 90°) = a \sin \Delta \quad \text{(Eq. 11)}$$

And for the trip signal of Equation 8 produces:

$$a \cos(\Delta - 90°) = a \sin \Delta \quad \text{(Eq. 12)}$$

At this point, a study of Equations 9 and 10 show that the phase shift circuit 14 changes its output between a $\cos \Delta$ and $- a \cos \Delta$ for guard and trip signals. A study of Equations 11 and 12 shows that the phase shift circuit 15 maintains its output at a $\sin \Delta$ for both guard and trip signals. This fact is utilized in the remainder of my receiver.

The difference circuit 16 receives signals from the phase shift circuit 14 and the low pass filter 13. For a guard signal, the difference circuit 16 produces:

$$\text{Equation 9} - \text{Equation 7} = a \cos \Delta - a \cos \Delta = 0 \quad \text{(Eq. 13)}$$

And for a trip signal produces:

$$\text{Equation 8} - \text{Equation 10} = a \cos \Delta - (-a \cos \Delta) = 2a \cos \Delta \quad \text{(Eq. 14)}$$

The sum circuit 18 receives signals from the low pass filter 12 and the phase shift circuit 15. For a guard signal, the sum circuit 18 produces:

$$\text{Equation 5} + \text{Equation 11} = -a \sin \Delta + a \sin \Delta = 0 \quad \text{(Eq. 15)}$$

And for a trip signal, the sum circuit 18 produces:

$$\text{Equation 6} + \text{Equation 12} = a \sin \Delta + a \sin \Delta = 2a \sin \Delta \quad \text{(Eq. 16)}$$

The difference circuit 17 receives signals from the low pass filter 12 and the phase shift circuit 15. For a guard signal, the difference circuit 17 produces:

$$\text{Equation 11} - \text{Equation 5} = a \sin \Delta - (-a \sin \Delta) = 2a \sin \Delta \quad \text{(Eq. 17)}$$

And for a trip signal, the difference circuit 17 produces:

$$\text{Equation 6} - \text{Equation 12} = a \sin \Delta - a \sin \Delta = 0 \quad \text{(Eq. 18)}$$

The sum circuit 19 receives signals from the phase shift circuit 14 and the low pass filter 13. For a guard signal, the sum circuit 19 produces:

$$\text{Equation 9} + \text{Equation 7} = a \cos \Delta + a \cos \Delta = 2a \cos \Delta \quad \text{(Eq. 19)}$$

And for a trip signal, the sum circuit 19 produces:
$$\text{Equation 10} + \text{Equation 8} = -a \cos \Delta + a \cos \Delta = 0 \quad \text{(Eq. 20)}$$

Signals from the difference circuit 16 and the sum circuit 18 are applied to their respective full wave rectifiers 20, 22. The outputs of the rectifiers 20, 22 are applied to the sum circuit 24. for a guard signal, this sum represents the sums of Equations 13 and 15, which is zero. For a trip signal, this sum includes the full wave rectified sum of Equations 14 and 16, or $4a/\pi$. Similarly, the outputs of the difference circuit 17 and the sum circuit 19 are applied to their respective full wave rectifiers 21, 23. The outputs of the rectifiers 21, 23 are applied to the sum circuit 25. For a guard signal, this sum includes the full wave rectified sum of Equations 17 and 19, or $4a/\pi$. For a trip signal, the sum circuit 25 sums Equations 18 and 20, which is zero.

Summarizing the operation of my circuit to this point, the sum circuit 24 produces a zero output for a guard signal and a $4a/\pi$ output for a trip signal. The sum circuit 25 produces a $4a/\pi$ output for a guard signal and zero for a trip signal. The output of the sum circuit 24 may be filtered and is applied to the threshold circuit 26, and the output of the sum circuit 25 may be filtered and is applied to the threshold circuit 27. The threshold circuits 26, 27 may be operational amplifiers having one input connected to its respective sum circuit and the other input connected to a respective reference or threshold voltage. If a sum circuit output exceeds the reference voltage, then the threshold circuit produces an output which I have assumed to be a positive voltage or, in logic terms, a logic 1. If the threshold reference voltage is not exceeded, a negative voltage or a logic 0 is produced.

Reference is now made to FIG. 2 which summarizes the operation of the remainder of my circuit in logic terms. The outputs the threshold circuits 26, 27 are applied to the alien tone detector 30 which is intended to produce an indication if both guard and trip signals are received at the same time. The output of the threshold circuit 26 and the inverted output of the threshold circuit 27 are applied to the AND gate 31 which produces a logic 1 trip output if the threshold circuit 26 produces a logic 1 and if the threshold circuit 27 produces a logic 0. In the first line of FIG. 2, no FSK (frequency-shift-keyed) signal is received. Both threshold circuits 26, 27 produce a logic 0. The alien tone detector 30 also produces a logic 0, as does the gate 31. In the second line, only a guard FSK signal is received. The threshold circuit 26 produces a logic 0 and the threshold circuit 27 produces a logic 1. This is a normal condition for a power line, and the logic 1 from the threshold circuit 27 can be used to indicate that the system is functioning properly. The detector 30, and the gate 31 also produce a logic 0. In the third line, only a trip FSK signal is received. The threshold circuit 26 produces a logic 1, and the threshold circuit 27 produces a logic 0. The detector 30 produces a logic 0. The logic 0 from the threshold circuit 27 is inverted to a logic 1 by the inverter 29, and this logic 1 indicates no guard signal is produced. Both inputs to the gate 31 are at a logic 1 so that the gate 31 produces a logic 1. This logic 1 is a reliable indication that a true FSK trip signal has been received. Under this condition, tripping of a power line can be effected with reliable assurance that it is correct. In the fourth line, both guard and trip FSK signals are received at the same time. Both threshold circuit 26, 27 produce a logic 1. The alien tone detector 30 produces a logic 1 which can be used to indicate that both signals have been received, and that some erroneous condition is present. The logic 1 from the threshold circuit 27 is inverted to a logic 0 by the inverter 29, and this prevents the gate 31 from producing a trip output.

It will thus be seen that my circuit as described thus far provides improved and reliable operation for frequency-shift-keyed signals. My circuit actually provides two receiver paths. One path is through the even-numbered circuit elements 16, 18, 20, 22, 24, 26, and the other path is through the odd-numbered circuit elements 17, 19, 21, 23, 25, 27. These two paths provide improved reliability and signal-to-noise ratio, since any noise signals which may be present are more randomly distributed through my circuit. And persons skilled in the art will appreciate the various logic functions which can be derived from my circuit, particularly that part shown in FIG. 1B. For example, for a guard signal only, the logic 0 from the threshold circuit 26 and the logic 0 from the inverter 29 may be applied to a NOR gate which will produce a logic 1 if a guard signal is present and no trip signal is present. Other arrangements can be used.

Under more adverse conditions, the lower portion of my receiver, that is the parts indicated by reference numerals followed by a prime suffix, may be used in addition to the upper portion. The operation of this lower portion of my receiver is substantially identical to the operation of the upper portion previously described. The only difference is that a phase shift of +90 degrees is used instead of a phase shift of −90 degrees. The outputs of this lower portion can be combined with the outputs of the upper portion in an alien tone detector 60 which produces an alien tone output if both portions indicate that both guard and trip signals are present. Likewise, the trip output of the lower portion can be combined with the trip output of the upper portion in an AND gate 62 which requires both trip outputs from the gates 31, 31' in order for the gate 62 to produce a trip output. In tests, I have found that using both portions decreased false trips (because of noise) by a factor of about 100 over the use of just one of the portions.

It will thus be seen that I have provided a new and improved frequency-shift-keyed (FSK) receiver. My receiver is relatively simple, and can be constructed using integrated circuit techniques. My receiver provides improved and more reliable operation, since it uses circuits which introduce very little time delay, an important factor in power line switching. My receiver permits two signals or tones to be received and detected at the same time. Also, my receiver is versatile in that it only uses a single oscillator which, if a frequency synthesizer type circuit is included, permits the frequency of the FSK signals to be changed to any frequency desired and still be detected with the proper mixing frequency. A new crystal and new filters are not necessary. While I have shown only one embodiment, persons skilled in the art will appreciate and recognize the modifications which can be made. For example, odd multiples of 90 degree phase shift can be used, although 90 degrees is preferred because of its ease of attainment and small delay. However, the phase shift in any one portion should be the same. More portions, with other odd multiples of 90 degree phase shift, can be added for even greater reliability. Or, only one of the portions may be used. Also, signals indicative of the received signal amplitude can be derived by rectifying the output of the filters 12, 13. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved circuit for detecting the presence of first and second signals having first and second frequencies respectively, said improved circuit comprising:
  a. first and second mixers;
  b. means for applying said first and second signals to said first and second mixers;
  c. means for applying a first mixing signal to said first mixer and for applying a second mixing signal to said second mixer, said first and second mixing signals each having substantially the same frequency between said first and second frequencies, and having a substantially 90 degree phase relation;
  d. first and second deriving means respectively coupled to the output of said first and second mixers for deriving signals representative of the frequency difference between said first and second signals and said mixing signals;

e. first and second phase shift means respectively coupled to the outputs of said first and second deriving means for producing a phase shift to signals applied thereto;

f. first difference means connected to said first phase shift means and to said second deriving means for producing a first difference signal;

g. first summing means connected to said first deriving means and to said second phase shift means for producing a first summing signal;

h. second difference means connected to said first deriving means and to said second phase shift means for producing a second difference signal;

i. second summing means connected to said first phase shift means and to said second deriving means for producing a second summing signal;

j. third summing means connected to said first difference means and to said first summing means;

k. fourth summing means connected to said second difference means and to said second summing means;

l. and first output means connected to said third summing means and to said fourth summing means for producing an output signal therefrom.

2. The improved circuit of claim 1 and further comprising inverter means connected between said fourth summing means and said first output means.

3. The improved circuit of claim 1 wherein said first and second mixing signal frequency is substantially midway between said first and second frequencies.

4. The improved circuit of claim 3 and further comprising inverter means connected between said fourth summing means and said first output means.

5. The improved circuit of claim 1 wherein said phase shift produced by said first and second phase shift means is substantially an odd multiple, including unity, of 90 degrees.

6. The improved circuit of claim 5 wherein said first and second mixing signal frequency is substantially midway between said first and second frequencies.

7. The improved circuit of claim 1 and further comprising:
   a. third and fourth phase shift means respectively coupled to the outputs of said first and second deriving means for producing another predetermined phase shift to signals applied thereto;
   b. third difference means connected to said third phase shift means and to said second deriving means for producing a third different signal;
   c. fifth summing means connected to said first deriving means and to said fourth phase shift means for producing a third summing signal;
   d. fourth difference means connected to said first deriving means and to said fourth phase shift means for producing a fourth difference signal;
   e. sixth summing means connected to said third phase shift means and to said second deriving means for producing a fourth summing signal;
   f. seventh summing means connected to said sixth difference means and to said sixth summing means;
   g. eighth summing means connected to said seventh difference means and to said seventh summing means;
   h. second output means connected to said seventh summing means and to said eighth summing means for producing an output signal therefrom;
   i. and third output means connected to said first and second output means for producing an output signal therefrom.

8. The improved circuit of claim 7 and further comprising inverter means connected between said fourth summing means and said first output means, and inverter means connected between said eighth summing means and said second output means.

9. The improved circuit of claim 8 wherein said first and second phase shift means produce a 90 degree lagging phase shift, and wherein said third and fourth phase shift means produce a 90 degree leading phase shift.

10. An improved frequency-shift-keyed receiver for detecting two signals having a first frequency and a second frequency respectively, said receiver comprising:
   a. first means for mixing said first and second signals with a local signal having a frequency substantially centered between said first and second frequencies of said two signals and producing first and second signals having a quadrature relation;
   b. second means coupled to said first means for introducing respective phase shifts to said first and second signals produced thereby;
   c. third means coupled to said first means and to said second means for producing first and second difference signals and first and second summing signals;
   d. and fourth means coupled to said third means for combining the signals produced by said third means.

11. The improved receiver of claim 10 wherein said phase shifts are an odd multiple, including unity, of 90 degrees.

12. The improved receiver of claim 11 wherein said phase shifts are equal.

13. An improved frequency-shift-keyed receiver for detecting first and second tones, comprising:
   a. an input for said tones;
   b. first and second paths connected to said input, said first path having first mixer means, a first 90 degree phase shift circuit connected to said first mixer means, first sum and difference circuits connected to said first mixer means and to said first phase shift circuit, respectively, and a first threshold circuit connected to said first sum and difference circuits for producing a first signal in response to said first tone and a second signal in response to said second tone; and said second path having second mixer means, a second 90 degree phase shift circuit connected to said second mixer means, second sum and difference circuits connected to said input and to said second phase shift circuit, respectively, and a second threshold circuit connected to said second sum and difference circuits for producing a third signal in response to said first tone and a fourth signal in response to said second tone;
   c. and logic means connected to said first and second threshold circuits for producing a first control signal in response to the presence of said first and third signals, and for producing a second control signal in response to the presence of said second and fourth signals.

* * * * *

UNITED STATES PATENT OFFICE
CERTIFICATE OF CORRECTION

Patent No. 4,156,194      Dated May 22, 1979

Inventor(s) Otward Mueller

It is certified that error appears in the above-identified patent and that said Letters Patent are hereby corrected as shown below:

Column 10, Claim 13, line 55, cancel "input" and insert

-- second mixer means --

Signed and Sealed this

Fourth Day of December 1979

[SEAL]

Attest:

SIDNEY A. DIAMOND

Attesting Officer      Commissioner of Patents and Trademarks